United States Patent [19]

Lazar

[11] Patent Number: 5,290,825
[45] Date of Patent: Mar. 1, 1994

[54] COMPOSITION AND METHOD FOR INHIBITING THE CURE OF CYANOACRYLATE ADHESIVES AND CURE INHIBITED CYANOACRYLATE ADHESIVE COMPOSITIONS

[76] Inventor: Warren G. Lazar, 8401 N. Rancho Catalina Dr., Tucson, Ariz. 85704

[21] Appl. No.: 41,879

[22] Filed: Apr. 2, 1993

Related U.S. Application Data

[60] Continuation of Ser. No. 925,226, Aug. 3, 1992, abandoned, which is a continuation of Ser. No. 719,063, Jun. 19, 1991, abandoned, which is a division of Ser. No. 511,850, Apr. 12, 1990, abandoned, which is a continuation of Ser. No. 287,568, Dec. 19, 1988, abandoned, which is a continuation of Ser. No. 96,816, Sep. 10, 1987, abandoned, which is a continuation of Ser. No. 883,274, Jul. 7, 1986, abandoned, which is a continuation of Ser. No. 735,440, May 17, 1985, abandoned.

[51] Int. Cl.$^5$ .............................................. C09J 4/04
[52] U.S. Cl. ............................. 523/176; 524/403; 524/413; 524/430; 524/437; 526/297
[58] Field of Search ............... 523/176; 524/403, 413, 524/430, 437; 526/297

[56] References Cited

U.S. PATENT DOCUMENTS

| | | | |
|---|---|---|---|
| 2,851,417 | 9/1958 | Andress, Jr. | 252/400 R |
| 3,194,823 | 7/1965 | Suer et al. | 252/400 R |
| 4,182,823 | 1/1980 | Schoenberg | 526/298 |
| 4,460,759 | 7/1984 | Robins | 526/298 |

*Primary Examiner*—Christopher Henderson
*Assistant Examiner*—N. Sarofim
*Attorney, Agent, or Firm*—Darby & Darby

[57] ABSTRACT

This invention relates to compositions containing cyanoacrylate adhesives that are temporarily inhibited from polymerizing and curing even in the presence of activating substances, such as metals, which normally catalyze polymerization of cyanocrylate adhesive compositions. This invention also relates to compositions and methods for inhibiting polymerization and curing of cyanoacrylate adhesives.

8 Claims, No Drawings

COMPOSITION AND METHOD FOR INHIBITING THE CURE OF CYANOACRYLATE ADHESIVES AND CURE INHIBITED CYANOACRYLATE ADHESIVE COMPOSITIONS

This is a continuation of application Ser. No. 07/925,226, filed Aug. 3, 1992, now abandoned, which is a continuation of Ser. No. 719,063 filed Jun. 19, 1991, now abandoned, which is a division of Ser. No. 511,850, filed Apr. 12, 1990, now abandoned, which is a continuation of Ser. No. 07/287,568, filed Dec. 19, 1988, now abandoned, which is a continuation of Ser. No. 07/096,816, filed Sep. 10, 1987, now abandoned, which is a continuation of Ser. No. 06/883,274, filed Jul. 7, 1986, now abandoned, which is a continuation of Ser. No. 06/735,440, filed May 17, 1985, now abandoned.

BACKGROUND OF THE INVENTION

DESCRIPTION OF THE PRIOR ART

A major drawback of cyanoacrylate compounds is their tendency to polymerize rapidly and often uncontrollably when contacted or mixed with various activating substances, especially substances that form ions in solution. Even trace quantities of such activators as organic salts, inorganic salts, metals, water, urea, oxides, etc., substantially increase the rate of cyanoacrylate polymerization. This tendency has limited the usefulness of cyanoacrylate compounds to ordinary adhesive applications. If cyanoacrylate compounds could be mixed with sufficient quantities of various activating substances without polymerizing immediately, they would be useful in a wide variety of additional applications.

The development of cyanoacrylates, such as methyl-2-cyanoacrylate, ethyl-2-cyanoacrylate, propyl-2-cyanoacrylate, 2-ethylhexyl-2-cyanoacrylate, isobutyl-2-cyanoacrylate, n-butylcyanoacrylate, hexyl-, heptyl-, and octyl-cyanoacrylate, etc., represented a major technological advance in the bonding and adhesive art.

The preparation of cyanoacrylates is well-known. It is described in such U.S. Pat. Nos. 2,467,926; 2,794,788; 2,912,454; and No. 2,926,188, the disclosures of which are incorporated by reference. The use of cyanoacrylate polymers as adhesives is described in such U.S. Pat. Nos. 2,776,232; 2,794,788; and No. 2,467,926, also incorporated by reference. The cyanoacrylate adhesives are fast-drying, high tensile-strength glues and bonding agents. Their use in bonding or joining materials together is very widespread in industry, in the household, and in special applications such as surgery (as tissue adhesives), dentistry, etc.

Various inorganic substances have been proposed as fillers or thickeners for cyanoacrylate monomer compositions. For example, U.S. Pat. No. 3,663,501 of Adams, et al. issued on May 16, 1972 discloses preparation of a dental cement containing finely divided sodium fluoride, fused silca, quartz, and alumina fillers. U.S. Pat. No. 3,607,542 of Leonard, et al. issued on Sep. 21, 1971 discloses the preparation of water-resistant cyanoacrylate paste containing insoluble inert fillers (such as various salts of calcium, titanium, zinc, tin, aluminum and iron) for use as adhesives in submerged applications and as fillings for teeth. Neither reference is concerned with the polymerization rate of cyanoacrylate adhesives or with its control.

Incorporation of acid inhibitors in cyanoacrylate compositions is known. For example, U.S. Pat. No. 4,182,823 of Schoenberg issued on Jan. 8, 1980 teaches that acid additives called "stabilizers" in the patent) including acid gases, other acids (such as acetic) or various Lewis acids (such as $FeCl_3$, $SnCl_2$ and $BF_3$) inhibit polymerization of cyanoacrylate compositions. The patent warns, however, that such additives must be used with caution because strong acids "over-stabilize" the monomer and weak acids do not "stabilize" it sufficiently. Schoenberg further observes that the acids (which are said to act as anionic polymerization inhibitors) interfere with the cure of the adhesive.

U.S. Pat. No. 2,794,788 of Coover issued on Jun. 4, 1957 states that sulfur dioxide is effective as a stabilizer for cyanoacrylate monomers, that boron trifluoride and hydrogen fluoride are also effective, but that carbon dioxide is less effective.

U.S. Pat. No. 4,460,759 of Robins issued Jul. 17, 1984 discloses a two-part cyanocrylate adhesive composition. One part of this composition contains weakly acidic or weakly ionic compounds as accelerators for polymerization, particularly when these compositions are used on wood substrates. Such accelerators are said to include metal halides. The first part contains acid gases and free-radical compounds as inhibitors.

Although many of the above references recognize the need to control the rate of polymerization of cyanoacrylate adhesives, the additives they propose are inadequate as inhibitors because their inhibitory effect cannot be well-controlled.

As stated in Schoenberg, supra, too little acid inhibitor is not effective and two much can interfere with polymer cure. In addition, many acid additives cause polymer decomposition, and shorten the useful life of the cyanoacrylate polymer.

Accordingly, it is an object of the present invention to provide novel compositions useful as inhibitor-stabilizers for cyanoacrylate compounds and compositions.

Another object is to provide novel inhibiting-stabilizing compositions for cyanoacrylates that effectively delay onset and propagation of polymerization reations even in the presence of activators for such reactions.

Another object is to provide cyanoacrylate compositions that are temporarily or permanently rendered non-reactive to activating substances.

Another object of the invention is to provide cyanoacrylate compositions that are temporarily or permanently inhibited from polymerizing in which the inhibitor does not cause premature decomposition of the polymer.

Another object is to provide cyanoacrylate compositions that are temporarily or permanently inhibited from polymerizing to a controlled extent although they contain substantial amounts of substances that act as catalysts for cyanoacrylate polymerization.

Another object is to provide cyanoacrylate compositions that are electrically or thermally conductive and have such polymerization and stability characteristics or mechanical properties as make them suitable for use in the manufacture of electronic and microelectronic components.

Another object is to expand the uses to which cyanoacrylate adhesive compositions can be put by providing compositions comprising cyanoacrylate monomers that are controllably inhibited towards polymerization and at the same time yield polymers with the desired degree of cure and stability.

A further object is to prepare cyanoacrylate adhesive compositions that can be spray-coated in place using inter alia on artists' air brush.

Yet another object is to provide methods for inhibiting the polymerization of cyanoacrylate compounds and for preparing polymerization-inhibited and stabilized compositions containing cyanoacrylate compounds and activators.

SUMMARY OF THE INVENTION

One aspect of this invention is directed to a composition comprising at least one organic acid and at least one hydrated or anhydrous base metal fluoride, chloride, bromide or iodide. The composition is useful in inhibiting-stabilizing cyanoacrylates.

Another aspect of the invention is directed to a cyanoacrylate composition temporarily or permanently inhibited from polymerizing, the composition including an organic acid and at least one hydrated or anhydrous metal fluoride, chloride, bromide or iodide. The composition may include a filler that is ordinarily an activator of cyanoacrylate polymerization.

Yet another aspect of the invention relates to a method for inhibiting cyanoacrylates against polymerization by incorporating either to said cyanoacrylates or to an activator additive thereof an inhibitor comprising a liquid organic acid and an anhydrous or hydrated metal fluoride, chloride, bromide or iodide, prior to mixing said cyanocrylate with said activator-additive, or simultaneously therewith.

DETAILED DESCRIPTION OF THE INVENTION

In accordance with the present invention, unpolymerized (or partially polymerized) cyanoacrylate compositions can be temporarily (or permanently) inhibited from reacting with polymerization-activating materials (activators) and at the same time stabilized against incomplete cure and/or premature decomposition.

This inhibition-sterilization of the cyanoacrylate is accomplished by incorporating an inhibitor-stabilizer either in the unpolymerized (or partially polymerized) cyanoacrylate or in an activator that will serve as an additive or filler of the final composition, said inhibitor-stabilizer comprising:
(a) an organic carboxylic acid; and
(b) a hydrated or anhydrous metal chloride, fluoride, bromide or iodide.

The inhibitor-stabilizer is preferably incorporated in the cyanoacrylate adhesive (monomer or prepolymer) prior to exposure of the latter to an activator, such as a metal, oxide, ionic solvent, salt, water or urea. However, it can also be incorporated to the activator prior to mixing it with the cyanoacrylate. The ingredients of the inhibitor-stabilizer must be premixed and may not be separately incorporated in the cyanoacrylate or activator.

Preferably, the inhibitor-stabilizer also includes a polar solvent to facilitate mixing with and solubility in the cyanoacrylate (or activator additive). In fact, unless the two active ingredients of the inhibitor-stabilizer are fully compatible with the cyanoacrylate (or activator-additive), use of a solvent is particularly desirable. Additional solvent may be used when the inhibitor-stabilizer is mixed with the cyanoacrylate to facilitate mixing. This additional solvent may but need not be a polar solvent; it can be any suitable organic solvent.

Suitable solvents for the inhibitor include polar organic and inorganic solvents, such as water, lower aliphatic alcohols, lower aliphatic ketones, lower aliphatic ethers of carboxylic acids, lower alkylene glycols, lower alkylene glycol ethers, lower aliphatic esters of carboxylic acids, carboxylic acid nitriles, and mixtures thereof. Methyl chloride, formaldehyde and dimethyl sulfoxide are also useful as solvents in the present invention.

Preferred solvents are: water; acetone, methyl ethyl ketone, methyl propyl ketone, methyl isobutyl ketone, ethyl butyl ketone, acetyl acetone; methanol, ethanol, propanol, isopropanol, butanol, isobutanol, and hexanol, ethyl acetate, propyl acetate, isopropyl acetate, butyl acetate, and methyl-CELLOSOLVE ®-acetate (methyl-2-ethoxyethanol acetate; CELLOSOLVE ® is a trademark of Union Carbide Corporation); ethyl ether, dimethyl ether, and diethylene glycol ethyl ether (diethyl-CARBITOL ®; a trademark of Union Carbide Corporation); methyl-CELLOSOLVE, butyl CELLOSOLVE, methyl glycol ether, butoxy triglycol, methoxy triglycol, glycol methyl CARBITOL; and acetonitrile.

The most preferred solvents for use in the present invention are: water, acetone, ethanol, ethyl acetate, dimethyl ether, glycol methyl CARBITOL, and acetonitrile.

Preferred acids for the inhibitor-stabilizer are formic acid, acetic acid, propionic acid, butanoic acid, lactic acid, pentenoic acid, carbonic acid, etc. Most preferred is formic acid.

Preferred metal halide salts are: $FeCl_3$; $FeCl_3.6H_2O$; $LiF$; $CdCl_2$; $CdCl_2.2\frac{1}{2}H_2O$; $MgBr.6H_2O$; $SnBr_4$; $GeCl_4$; $MgCl_2$; $ZnCl_2$; $ZnBr$; $MnCl_2.4H_2O$; $LiI.3H_2O$; $LiI.H_2O$; $SnCl_2.6H_2O$; and $SnCl_2.2H_2O$. Magnesium bromide hexahydrate, tin cloride hexahydrate and ferric chloride hexahydrate are most preferred.

Non-polar solvents that can be added to the inhibited cyanoacrylate composition include without limitation plasticizers, such as dibutyl phthalate, tricresyl phosphate, dimethyl phthalate, etc.

Generally suitable relative proportions of the ingredients of the inhibitor-stabilizer, i.e. the acid, salt and solvent (if any) are: acid—about 0.002–55%; salt—about 0.002–50%; and solvent—about 0–75% by weight.

As a weight percentage of the cyanoacrylate monomer the inhibitor-stabilizer can be about 0.10–55%.

The above proportions are given by way of guidelines. The actual amount of the inhibiting-stabilizing composition will depend on how long it is desired to delay the onset of polymerization for the final cyanoacrylate mixture (i.e. after addition of the activating substance) and, to a lesser extent, on the ability of the activator to catalyze cyanoacrylate polymerization. It should be noted that as the percentage compositive of acid and salt is increased, the cure time of the adhesive composition increases.

The duration of the stabilization or inhibition provided by a given stabilizer/acrylate formulation is also dependent upon the ambient temperature to which the material is exposed. Storage of an inhibited cyanocrylate compound of the present invention at 120° F. for 3 weeks would result in some curing of the adhesive, however, if the same composition were stored at 40° F. for 3 months little or no curing would take place.

By varying the ratio of inhibitor ingredients to cyanoacrylate constituents in the present invention, it is possible to inhibit curing for periods varying between a few minutes and several months.

The incorporation of the inhibitor-stabilizer renders the cyanoacrylate non-reactive to activating substances for a period of time at least long enough to permit mixing of the cyanocrylate with the activator and any processing, storage, or fabrication necessary for the particular end application envisioned.

By the present invention, a multitude of applications become possible. The following are listed for illustration purposes only.

1) Electrically Conductive Cyanoacrylate Compositions and Materials

Incorporation of a metal with high conductivity (in powder or other particulate form) as a filler can render a cyanoacrylate composition electrically conductive. Before the present invention, it was impossible to incorporate sufficient metal as a filler to render the polymer electrically conductive because rapid polymerization of the cyanoacrylate would begin immediately following addition of even minute quantities of metal. This made further addition of metal impossible. Moreover, rapid polymerization of the metal-filled cyanoacrylate would interfere with the processing or fabrication of the finished product.

Metal-filled cyanoacrylate polymers can be used in die and wire bonding of microelectronic circuits instead of solder. In addition, they can be used as conductive terminals for resistors, as electrodes for capacitors and for a variety of functions in thick-film hybrid microelectronic circuits. The metal-filled cyanoacrylate compositions can be applied to circuit boards by conventional screening methods. Electrically conductive cyanoacrylate compositions preferably contain about 0.5-7.0% of inhibitor, 0.05-0.4% acid, 0.08 to 0.8% salt and about 0.4% to 10.0% solvent by weight of the cyanoacrylate monomer.

Other applications for conductive cyanoacrylates are in high-conductivity metallization films and coatings for plastics, paper, mica, ceramics and other non-conductive materials. The metallized films and coatings allow direct soft-soldering without the use of flux and may be further metal-coated by electroplating. Such films and coatings are useful in electronic and microwave applications as connectors, contacts, magnetic shields, especially in metal shields that are used to protect from Radio Frequency Interference (RFI) and Electro Magnetic Interference (EMI) and capacitor terminals. They can be applied by brushing, dipping, or spraying, or by conventional screening techniques using standard 180 to 200 mesh screens.

These conductive, film-forming cyanoacrylate compositions preferably contain about 1.0-7.0% inhibitor-stabilizer (0.07 to 0.6 acid, 0.2 to 1.3% salt) and about 1.0-10.0% solvent.

Suitable metal fillers for electrically conductive cyanoacrylates, in general, include one or more of palladium, silver, copper, tin, gold, and platinum and other high-conductivity metals. The metal filler may first be combined with the inhibitor composition and the metal-containing inhibitor may subsequently be introduced into the cyanocrylate. This makes it possible to package these constituents separately for mixing by the consumer just prior to use (as an A&B component system).

2) Thermally Conductive Cyanoacrylate Compositions and Materials

Incorporation of fillers can also produce thermoconductive materials that can be used as heat sinks for the base and mounting stud of transistors, diodes, and rectifiers; and as coupling agents to reduce thermal contact resistance. Suitable fillers for this purpose include base metals, such as iron, aluminum, tin, and metal oxides that are not electrically conductive, etc.

Another use for thermally conductive cyanoacrylates is for application between, e.g., semiconductor power devices and heat sinks; power resistors and chassis mounts; thermostats and mounting surfaces; and anywhere else where the efficient transfer and removal of heat are necessary or desirable. Finally, they can be used in thermoelectric devices (e.g. in transformers as anti-static layers and heat sinks) and in heat dissipaters for electronic devices. Suitable fillers for this purpose are base metal oxides (especially alumina) and iron, nickel, titanium, tin; gold, silver, copper and all heavy metals.

Thermally conductive cyanoacrylate compositions according to this invention preferably contain about 1.0 to 7.0% inhibitor 0.07 to 0.6% acid, 0.2 to 1.3% salt and about 1–11% solvent.

The thermally conductive cyanocrylates of the present invention can be used in place of other thermoconductive plastic materials including thermoconductive expoxies containing alumina or other metals. These thermal cyanoacrylates may be employed to join heat sinks and other components to printed circuit boards and in like applications.

3) Photoconductive Cyanoacrylate Compositions and Materials

In general, these are liquid or screenable paste (slurry) compositions that can be used in the manufacture of photocells used for light sensors, light-controlled relay operations, exposure meters, fire detectors, photometers, lamp controls, liquid level indicators and a variety of other detectors. Suitable fillers include cadmium sulfide, cadmium selenide and cadmium-sulfoselenide. Compositions used in these applications preferably contain about 0.5-0.2% acid about 0.08-0.24% salt and about 1–11% solvent.

It will be understood by those skilled in the art of the present invention that a variety of other fillers can be incorporated to the inhibited-stabilized cyanoacrylates contemplated herein. These include one or more of plasticizers, silicones, silica, polymeric fillers, fibers, magnetic resins, pharmaceuticals, dyes, water, nonpolar solvents, radioactive materials, viscosity modifiers, human and animal skin, etc.

This invention is for use with any cyanoacrylate monomer (or prepolymer) including but not limited to those set forth in the Background of the Invention, or mixtures thereof.

The invention will be further described below by reference to specific examples, which are intended to illustrate it without limiting its scope. Thus, the scope of the present invention is not to be limited to the cyanoacrylates, fillers, acids, salts and solvents or proportions disclosed in the Examples, below.

EXAMPLE 1

A stabilizing-inhibiting composition with or without a solvent is formed by mixing the following ingredients:

| Formula (A) | | Formula (B) | |
|---|---|---|---|
| 40.7% | SnCl$_2$.6H$_2$O | 15.9% | MgBr$_2$.6H$_2$O |
| 40.7% | Water | 15.9% | Water |
| 18.6% | Formic Acid | 7.3% | Formic acid |
| | | 30.5% | Acetone |
| | | 30.5% | Ethyl Cellosolve |
| Formula (C) | | Formula (D) | |
| 23.5% | FeCl$_3$.6H$_2$O | 50.0% | SnCl$_2$.6H$_2$O |
| 23.5 | Acetone | — | |
| 53.0% | Formic Acid | 50.0% | Acetic Acid |
| Formula (E) | | | |
| 15.9% | SnCl$_2$.6H$_2$O | | |
| 30.5% | Butoxyethylene glycol | | |
| 15.9% | H$_2$O | | |
| 7.3% | Formic acid | | |
| 30.5% | Acetone | | |

EXAMPLE 2

An inhibited-stabilized methyl-2-cyanoacrylate composition is made by mixing one of the stabilizing-inhibiting compositions according to Example 1 with methyl-2-cyanoacrylate monomer and a solvent to improve mixing. The resulting compositions in weight percent are shown in the table below:

| Inhibited Cyanoacrylate Composition No. | I | II | III | IV |
|---|---|---|---|---|
| Inhibitor (Any one of Ex. 1) | 0.05 | 0.5 | 18.0 | 0.8 |
| Acetone | 2.0 | 2.0 | 3.0 | 0.8 |
| Methyl Cyanoacrylate | 97.95 | 97.5 | 76.0 | 98.2 |
| Methyl-CELLOSOLVE ® | — | — | — | 0.2 |
| Ethyl Acetone | — | — | 3.0 | — |

EXAMPLE 3

An electrically conductive cyanoacrylate composition is formed from the inhibited-stabilized compositions No. II of Example 2 and the following ingredients:

| Inhibited-Stabilized C.A. | 84.0 (II) | 50.0 (II) | 35.0 (II) |
|---|---|---|---|
| Gold Powder | 16.0 | — | — |
| Silver Powder | — | 37.0 | — |
| Tin Powder | — | — | 65.0 |
| Copper Powder | — | 13.0 | — |
| | 100.00 | 100.00 | 100.00 |

These compositions will not polymerize for about 24 hours from incorporation of the metal powders.

EXAMPLE 4

A thermoconductive cyanoacrylate composition is formed from the inhibited-stabilized cyanoacrylate compositions No. III of Example 2 and the following ingredients:

| Inhibited-Stabilized C.A. | 50.0 (III) | 49.0 (III) | 54.0 (III) |
|---|---|---|---|
| Copper Powder | 50.0 | — | — |
| Iron Powder | — | 40.0 | — |
| Thulium Powder | — | — | 36.0 |
| Tungsten Powder | — | 21.00 | 10.0 |

The thermoconductive compositions will not polymerize for about 24 hours from incorporation of the metal powders.

EXAMPLE 5

A fiber-filled cyanoacrylate composition is prepared as outlined above, except that the cyanoacrylate compositions No. IV and II were used.

| Inhibited-Stabilized C.A. | 85.0 (IV) | 92.0 (II) |
|---|---|---|
| Paper Fiber | 5.0 | — |
| Wool Fiber | 10.0 | 8.0 |

These compositions will not polymerize for about 24 hours after incorporation of the fibers. They can be used as adhesives, especially in high impact resistant applications and in joining sheet and cloth materials (e.g. textile fabrics, leather and vinyl sheets).

EXAMPLE 6

A flexible plasticized cyanoacrylate composition for use as a caulking material is prepared by mixing the inhibitor-stabilized cyanoacrylate of Example 2 with the following ingredients:

| Inhibited-Stabilized C.A. | 99.2 (IV) | 90.0 (II) |
|---|---|---|
| Plasticizer [Propylene carbonate] | 0.8 | 5.0 |
| Plasticized polyvinyl acetate | — | 5.0 |

EXAMPLE 7

A sprayable cyanoacrylate composition containing finely divided silver particles was prepared by admixing a stabilized-inhibited cyanoacrylate composition (Formula I of Example 2 prepared with inhibitor Formula E of Example 1) with 30 percent by weight of the stabilized inhibited cyanoacrylate composition of finely divided metallic silver particles (average size 200-300 mesh). The siler powder is stirred in with a single blade electric laboratory mixer until an essentially homogeneous silver dispersion is obtained. The silver containing cyanoacrylate mixture is loaded into the reservoir of a Badger brand artists' air brush. The brush is connected to a source of pressurized air (30-40 psi). Plastic sheets (each approximately 2"×2"×¼") of Styrene, ABS and acrylic (plexiglass) were laid on a flat surface.

A solution of 5% toluidine was coated on the upper surface of the ABS plastic sheet and allowed to dry at room temperature (15° C.).

The silver-containing cyanoacrylate composition was sprayed across the entire upper surface of the three plastic sheets (with the nozzle of the air brush held approximately eight inches from the surface of each sheet) using broad sweeping strokes.

At the conclusion of the spraying operation, a second sheet of styrene was applied to the cyanocrylate sprayed surface of the first styrene sheet and pressed down momentarily (using band pressure).

The cyanocrylate on the ABS sheet cured in approximately 3 minutes.

The cyanoacrylate joining the styrene sheets cured to working condition (i.e. to a condition in which the sheets could not be pulled apart by hand) in approximately fifteen minutes.

The cyanoacrylate on the acrylic sheet cured within one hour.

The method for making the compositions of the present invention employed in the specific embodiments described above is basically the same regardless of the particular cyanoacrylate, activator-filler and inhibitor-stabilizer used.

As those skilled in the art will appreciate, many modifications, additions, omissions and substitutions can be made, all within the scope and spirit of the present invention as claimed below.

What is claimed is:

1. A method for inhibiting the activation of polymerization of monomeric cyanoacrylate compositions in the presence of a substance that acts as an activator for said polymerization, the method comprising:

adding to said cyanoacrylate composition as activator a member of the group consisting of powders of palladium, silver, copper, tin, gold, platinum, iron, aluminum, metal oxides, calcium sulfide, cadmium selenide, cadmium sulfoselenide, wool and paper fiber, adding to the cyanoacrylate composition prior to or simultaneously with the addition of said activator an inhibitor composition in an amount effective to at least delay activation of the polymerization by said activator, said inhibitor composition comprising 0.002 to about 55% of at least one organic acid; and 0.002 to about 50% of at least one hydrated or anhydrous base metal halide; and 0 to about 75% of a polar solvent; wherein said percentages are by weight based on the weight of said inhibitor.

2. The method of claim 1 wherein said acid is selected from the group consisting of formic acid, acetic acid, propionic acid, lactic acid, pentenoic acid, butyric acid, carbonic acid, and mixtures thereof.

3. The method of claim 1 wherein said metal halide is selected from the group consisting of $FeCl_3$; $FeCl_3.6H_2O$; $LiF$; $CdCl_2.2\frac{1}{2}H_2O$; $MgBr.6H_2O$; $SnBr_4$; $GeCl_4$; $MgCl_2$; $ZnCl_2$; $ZnBr$; $MnCl_2.4H_2O$; $LiI.3H_2O$; $SnCl_2.6H_2O$; $SnCl_2O$ and mixtures thereof.

4. The method of claim 2 wherein said metal halide is selected from the group consisting of $FeCl_3$; $FeCl_3$; $6H_2O$; $LiF$; $CdCl_2.2\frac{1}{2}H_2O$; $MgBr.6H_2O$; $SnBr_4$; $GeCl_4$; $MgCl_2$; $ZnCl_2$; $ZnBr$; $MnCl_2.4H_2O$; $LiI.3H_2O$; $SnCl_2.6H_2O$; $SnCl_2O$ and mixtures thereof.

5. The method of claim 1 wherein said solvent is selected from the group consisting of water, aliphatic, alcohols, lower alkylene glycols, lower alkylene glycol ethers, carboxylic acid nitriles and mixtures thereof.

6. The method of claim 1 wherein the amount of said inhibitor composition is between 0.1 and 50% by weight based on the cyanoacrylate.

7. The method of claim 6 wherein said solvent is selected from the group consisting of water, acetone, acetonitrile, ethanol, ethylene glycol, ethyl acetate dimethyl ether and glycol methyl carbinol.

8. The method of claim 6 wherein the amount of said inhibitor composition is between 1 and 25% by weight based on the cyanoacrylate.

* * * * *